United States Patent [19]

Chuang et al.

[11] Patent Number: 5,770,830
[45] Date of Patent: Jun. 23, 1998

[54] METHOD AND APPARATUS FOR WIRE-CUTTING CURVED WORKPIECES BY COMPENSATING MACHINING PARAMETERS ON WIRE-CUT ELECTRIC DISCHARGE MACHINE

[75] Inventors: Hsin-Jung Chuang, Yung He; Jui-Fang Liang, Fu Shing Village, both of Taiwan

[73] Assignee: Industrial Technology Research Institute, Hsinchu, Taiwan

[21] Appl. No.: 555,948

[22] Filed: Nov. 13, 1995

[51] Int. Cl.$^6$ .................................................. B23H 7/02
[52] U.S. Cl. ........................................................ 219/69.12
[58] Field of Search ........................................ 219/69.12

[56] References Cited

U.S. PATENT DOCUMENTS

| | | | |
|---|---|---|---|
| 4,520,253 | 5/1985 | Gamo et al. | 219/69.12 |
| 4,523,073 | 6/1985 | Gamo et al. | 219/69.12 |
| 4,546,227 | 10/1985 | Gamo et al. | 219/69.12 |
| 5,453,592 | 9/1995 | Takeuchi et al. | 219/69.12 |

FOREIGN PATENT DOCUMENTS

| | | | |
|---|---|---|---|
| 657553 | 9/1986 | Switzerland | 219/69.12 |
| 2169536 | 7/1986 | United Kingdom | 219/69.12 |

*Primary Examiner*—Geoffrey S. Evans
*Attorney, Agent, or Firm*—W. Wayne Liauh

[57] ABSTRACT

A method and apparatus for automatically compensating machining parameters on a wire cut electric discharge machine. The shape of the workpiece is monitored during machining. When a curved shape is being machined, machining parameters are compensated to minimize servo lag and wire flexture to raise the precision of the machined workpiece.

4 Claims, 3 Drawing Sheets

METHOD AND APPARATUS FOR WIRE-CUTTING CURVED WORKPIECES BY COMPENSATING MACHINING PARAMETERS ON WIRE-CUT ELECTRIC DISCHARGE MACHINE

BACKGROUND OF THE INVENTION

1. Field of the Invention

The present invention relates to wire-cut electric discharge machines, and more particularly, to a method and apparatus used on wire-cut electric discharge machines for automatically compensating machining parameters so as to minimize machining errors due to servo lag and wire flexure.

2. Description of Prior Art

FIG. 1 is a schematic cross-sectional diagram showing the machining of a workpiece 1 by a wire-cut electric discharge machine, in which a wire 2 is directed by guides 3a, 3b to machine the workpiece 1 in the direction indicated by the arrow A. Due to the thickness of the workpiece 1, when the wire-cut electric discharge machine performs the machining in the A direction, i.e., when the workpiece 1 moves in the opposite direction, part of wire 2 will be flexed (the flexed part is indicated by 2a). Similarly, when the wire is used to machine the workpiece for a curved shape, the electric discharge in the machining will cause the wire to flex, thus causing an error in the curvature of the desired shape, as illustrated in FIG. 2, in which the dotted curve indicated by 4a shows the desired shape for the work-piece while the solid curve indicated by 4b shows the actually resulted shape, and the error in thickness between the two is indicated by 5.

To solve the foregoing problem, there are several methods disclosed. Among them, U.S. Pat. No. 4,499,359 entitled "Shape Compensating Method for Wire-Cut Electric Discharge Machine" to Fanuc granted on Feb. 12, 1985 discloses a method that compensates the curvature based on calculated amount of wire flexure based on discharge energy. Still, U.S. Pat. No. 4,546,227 entitled "Method of Reducing Wire-Cut Electric Discharge Machine Errors" also to Fanuc granted on Oct. 8, 1985 discloses another method that compensates the curvature by means of a servo control that controls the feedrate based on calculated amount of convex of the curved shape. Still another patent to Fanuc, U.S. Pat. No. 4,523,073 entitled "Wire-Cut Electric Discharge Machine Controller for Compensating the Machining Cornering Parameters" granted on Jan. 11, 1985 discloses still another method that controls the feedrate based on thickness of workpiece, the cornering, and curvature of radius of the curved shape.

The foregoing disclosures, although feasible to solve the aforementioned problem, still present some drawbacks in the implementation, particularly in the requirement of a data base that stores detailed and precisely measured machining data, which is time-consuming to build.

SUMMARY OF THE INVENTION

It is therefore a primary objective of the present invention to provide a method and apparatus capable of compensating preset machining parameters so as to correct machining error due to servo lag and wire flexure.

It is another objective of the present invention to provide a method and apparatus capable of correct the variation of machining error caused by manufacture or aging of the wire-cut electric discharge machine.

In accordance with the foregoing and other objectives of the present invention, there is provided with a novel method and apparatus capable of compensating preset machining parameters. The method according to the present invention comprises the following steps of: (1) setting the machining parameters, which are invariably used for the machining process if the shape of workpiece being machined is flat; (2) if the shape of workpiece being machined is curved, compensating the machining parameters by means of the following substeps: (2a) measuring the radius of curvature of the curved shape through the use of interpolation computing means prior to the machining process; (2b) obtaining compensation factors in accordance with the following criteria:

| Criterion 1: | if (RADIUS $\leq R_1$), then (P = $P_1$, Q = $Q_1$) |
|---|---|
| Criterion 2: | if ($R_1$ < RADIUS $\leq R_2$), then (P = $P_2$, Q = $Q_2$) |
| Criterion 3: | if ($R_2$ < RADIUS $\leq R_3$), then (P = $P_3$, Q = $Q_3$) |
| . | |
| . | |
| . | |
| Criterion n: | if ($R_{n-1}$ < RADIUS $\leq R_n$), then (P = $P_n$, Q = $Q_n$) |
| Criterion n + 1: | if ($R_n$ < RADIUS), then (P = $P_{n+1}$, Q = $Q_{n+1}$) | wherein

RADIUS is the radius of curvature of the curved shape;

$R_1$ to $R_n$ are preset constants for each segment;

P and Q are compensation factors;

$P_1$ to $P_{n+1}$ and $Q_1$ to $Q_{n+1}$ are preset constants for each segment;

(2c) compensating the machining parameters preset in said Step (1) by the compensation factors as follows:

on-time=on-time×P off-time=off-time×(1+P)

arc-on-time=arc-on-time×P arc-off-time=arc-off-time×(1+P)

wire-tension=wire-tension×(1+Q)

feedrate=feedrate×P wherein on-time: the discharge time under normal condition;

off-time: the time the discharge is off under normal condition;

arc-on-time: the discharge time under arc condition;

arc-off-time: the time the discharge is off under arc condition;

wire-tension: the tension of the wire; and feedrate: reference feed rate of the machining workpiece.

(2d) applying the machining parameters to machine the workpiece and then measuring the error between the radius of curvature of the newly cut curved shape and that of the desired shape, and if the error is greater than a preset tolerance, correcting the criteria as follows:

determining which range the radius of curvature is within, if $R_{k-1} \leq$ RADIUS $\leq R_k$, then compensating the (k)th criterion as follows:

$P_k = P_k + \Delta P$ $Q_k = Q_k + \Delta Q$

Wherein $\Delta P$ and $\Delta Q$ are the predetermined amounts of compensation.

And the apparatus for carrying out the forgoing method comprises: means for setting machining parameters including:

on-time: the discharge time under normal condition;

off-time: the time the discharge is off under normal condition;

arc-on-time: the discharge time under arc condition;

arc-off-time: the time the discharge is off under arc condition;

wire-tension: the tension of the wire; and feedrate: reference feed rate of the machining workpiece.

Further, the machining parameter setting means is coupled to controller means including: interpolation computing means, capable of detecting the shape of workpiece being machined in each segment, if the shape of workpiece being machined is flat, then machining it directly; if a curved shape being detected for machining, then measuring the radius of curvature of the curved shape prior to the machining process, thereafter based on the displacement and feed rate, the locus of machining process in flat shape or curved shape is converted to a pulse train output to each axis; decision means, receiving data of the measured radius of curvature from said interpolation computing means, for computing compensation factors based on the measured radius of curvature by means of a predetermined set of criteria; and parameter correcting means, receiving the compensation factors from said decision means, for compensating accordingly the preset machining parameters. And machining control means is coupled to said parameter correcting means for transferring the compensated machining parameters for use by the wire-cut electric discharge machine to machine workpiece.

BRIEF DESCRIPTION OF DRAWINGS

The present invention can be more fully understood by reading the subsequent detailed description of the preferred embodiments thereof with references made to the accompanying drawings, wherein.

DETAILED DESCRIPTION OF PREFERRED EMBODIMENT

Figure 1:
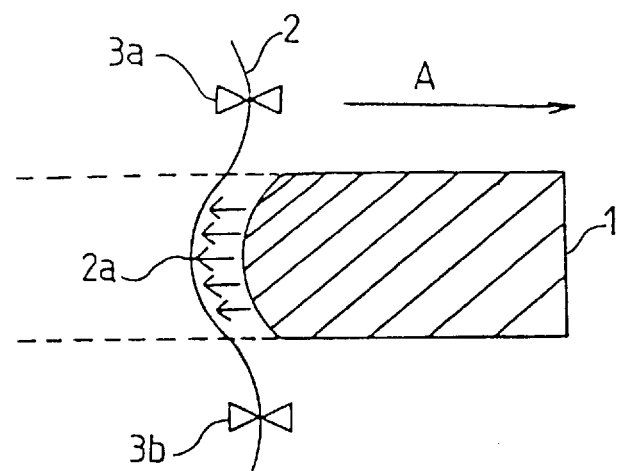
FIG. 1 is a schematic cross-sectional diagram, showing the phenomenon of a wire being bent on a wire-cut electric discharge machine.
Figure 2:
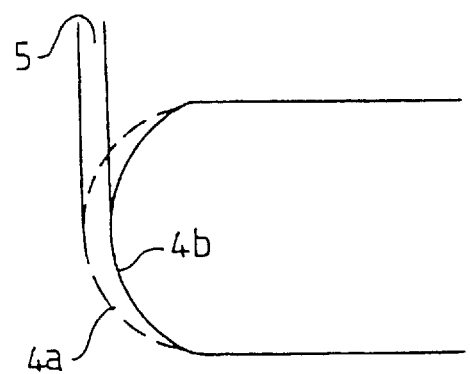
FIG. 2 is a schematic plane diagram, showing a machining error caused by wire flexure when wire-cutting a curved workpiece.
Figure 3:
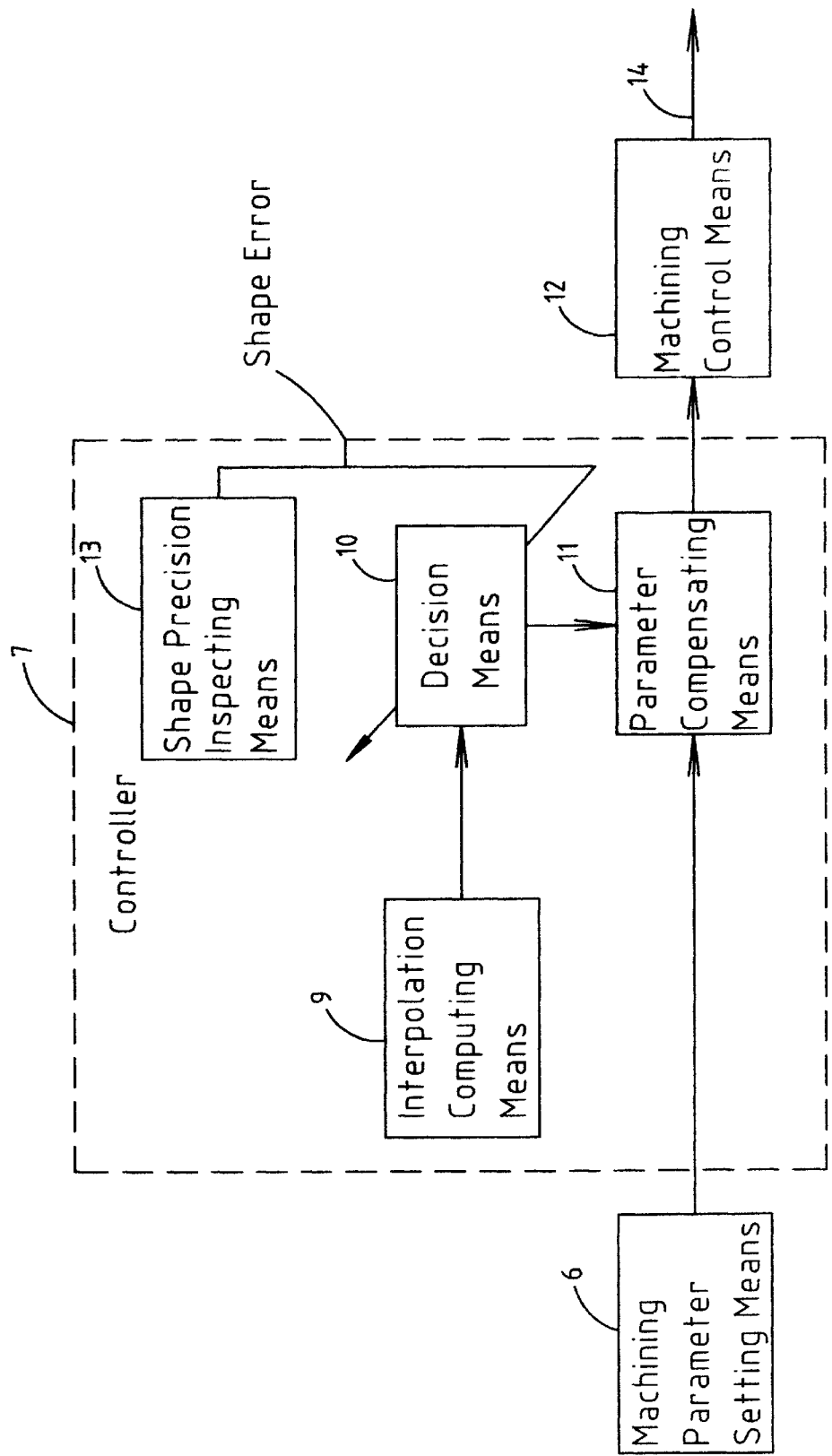
FIG. 3 is a block diagram, showing the apparatus according to the present invention for automatically compensating machining parameters on a wire-cut electric discharge machine.

FIG. 3 shows a schematic block diagram of an apparatus according to the present invention, which includes machining parameter setting means 6, controller 7 composed of interpolation computing means 9, decision means 10, parameter compensating means 11, and shape precision inspecting means 13, and machining control means 12 which outputs machining parameter data 14 to the CNC (not shown) that controls the machining process on the wire-cut electric discharge machine.

Using the machining parameter setting means 6, the operator can preset machining parameters as the discharge time under normal condition (on-time), the time the discharge is off under normal condition (off-time), the discharge time under arc condition (arc-on-time), the time the discharge is off under arc condition (arc-off-time), wire tension (wire-tension), and feed rate (feedrate). During the machining process, the controller 7 monitors whether the part of the workpiece being currently machined is a flat shape or a curved shape. If a flat shape, the machining control means 12 outputs the preset machining parameter to the CNC (not shown). On the other hand, if curved shape is monitored, the preset machining parameter will be compensated. On the controller 7, the interpolation computing means 9 monitors the shape in each segment of the workpiece along the machining process, if the shape of workpiece is machined in flat, then machines it directly; if the curved shape is detected, then the radius of curvature of the curved shape is measured prior to the machining process, and based on the displacement and feed rate, the locus of machining process in flat shape or curved shape is converted to a pulse train output to each axis.

The decision means 10 is used to compute compensation factors used to compensate the machining parameters. The computation is based on a predetermined set of criteria to obtain the compensation factors which are used by the parameter compensating means 11 to compensate the preset machining parameters. The machining control means 12 then transfers the compensated machining parameters to the CNC (not shown) to be used thereby to machine the workpiece. The result is further inspected by the shape precision inspecting means 13 and fed back to the decision means 10. If the error is still greater than a preset tolerance, the criteria will be further compensated.

The criteria used by the decision means 10 are designed as follows:

| | |
|---|---|
| Criterion 1: | if (RADIUS $\leq R_1$), then (P = $P_1$, Q = $Q_1$) |
| Criterion 2: | if ($R_1$ < RADIUS $\leq R_2$), then (P = $P_2$, Q = $Q_2$) |
| Criterion 3: | if ($R_2$ < RADIUS $\leq R_3$), then (P = $P_3$, Q = $Q_3$) |
| . | |
| . | |
| . | |
| Criterion n: | if ($R_{n-1}$ < RADIUS $\leq R_n$), then (P = $P_n$, Q = $Q_n$) |
| Criterion n + 1: | if ($R_n$ < RADIUS), then (P = $P_{n+1}$, Q = $Q_{n+1}$) | wherein

RADIUS is the radius of curvature of the curved shape;

$R_1$ to $R_n$ are preset constants for each segment;

P and Q are compensation factors;

$P_1$ to $P_{n+1}$ and $Q_1$ to $Q_{n+1}$ are preset constants for each segment;

In accordance with the calculated results using the foregoing criteria, the machining parameters are compensated as follows:

on-time=on-time×P off-time=off-time×(1+P)

arc-on-time=arc-on-time×P arc-off-time=arc-off-time×(1+P)

wire-tension=wire-tension×(1+Q)

feedrate=feedrate×P wherein on-time: the discharge time under normal condition;

off-time: the time the discharge is off under normal condition;

arc-on-time: the discharge time under arc condition;

arc-off-time: the time the discharge is off under arc condition;

wire-tension: the tension of the wire; and feedrate: reference feed rate of the machining workpiece.

The thus compensated machining parameters are then used to machine the workpiece. The result is inspected by the shape precision inspecting means 13 and the error is fed back to the decision means 10. If the error is still greater than a preset tolerance, the criteria are further compensated as follows. First, the detected radius of curvature is judged as to which range it lies within. If within the range $R_{k-1} \leq RADIUS \leq R_k$, then the (k)th criterion is compensated as follows:

$P_k = P_k + \Delta P$ $Q_k = Q_k + \Delta Q$ wherein $\Delta P$ and $\Delta Q$ are the predetermined amounts of compensation.

Figure 4:
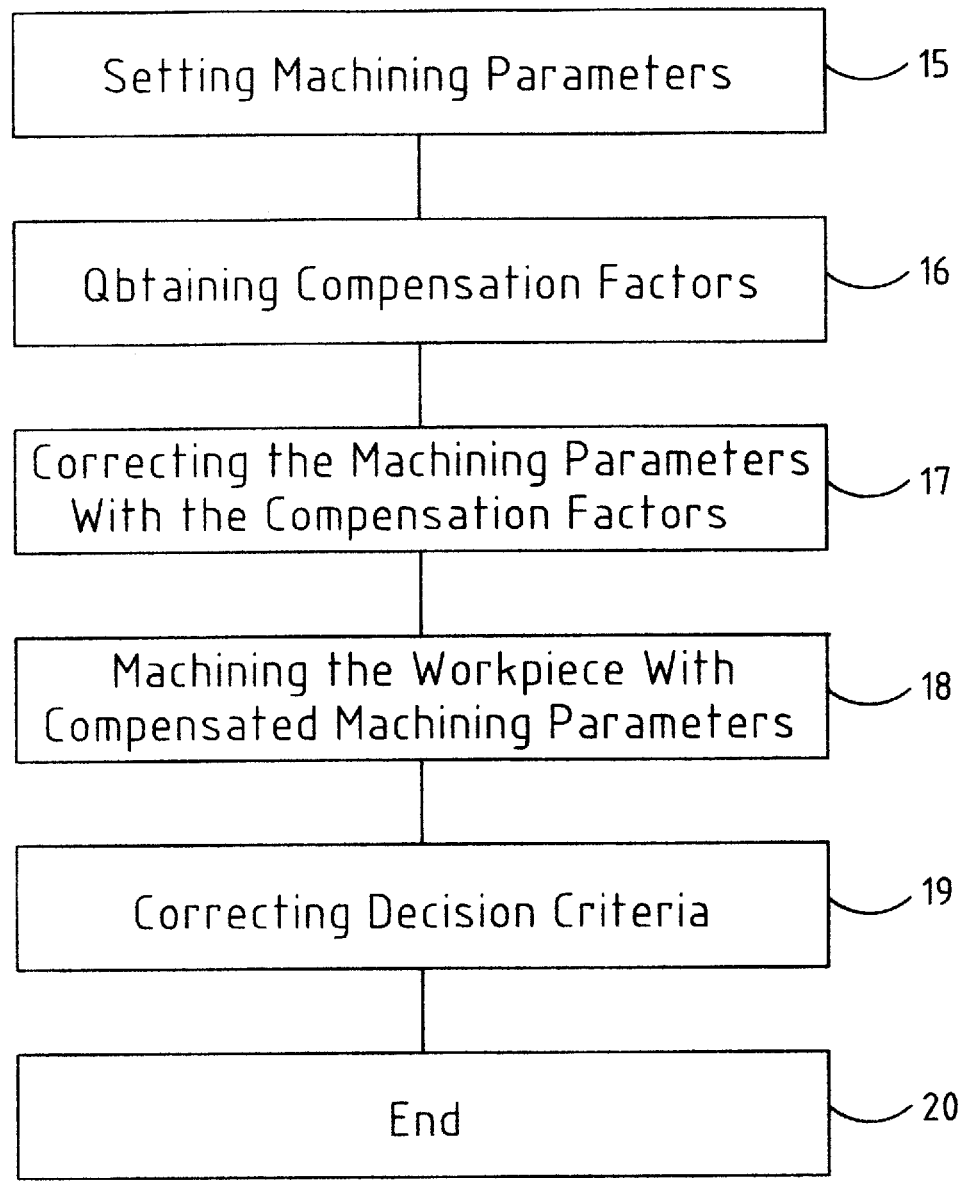
FIG. 4 is a flow diagram, showing the procedure carried out by the apparatus of FIG. 3 for automatically compensating machining parameters on a wire-cut electric discharge machine.

FIG. 4 is a flow diagram showing the procedure carried out by the apparatus of FIG. 3 based on the foregoing criteria for automatically compensating the machining parameters. In the first step 15, machining parameters are preset. If the shape of workpiece being machined is flat, the preset machining parameters are invariably used for the machining process. In the second step 16, if the shape of workpiece being machined is curved, the machining parameters are compensated by means of the following substeps:

(a) measuring the radius of curvature of the curved shape though the use of interpolation computing means prior to the machining process; and (b) obtaining compensation factors in accordance with the following criteria:

| | |
|---|---|
| Criterion 1: | if (RADIUS $\leq R_1$), then (P = $P_1$, Q = $Q_1$) |
| Criterion 2: | if ($R_1 <$ RADIUS $\leq R_2$), then (P = $P_2$, Q = $Q_2$) |
| Criterion 3: | if ($R_2 <$ RADIUS $\leq R_3$), then (P = $P_3$, Q = $Q_3$) |
| . | |
| . | |
| . | |
| Criterion n: | if ($R_{n-1} <$ RADIUS $\leq R_n$), then (P = $P_n$, Q = $Q_n$) |
| Criterion n + 1: | if ($R_n <$ RADIUS), then (P = $P_{n+1}$, Q = $Q_{n+1}$) | wherein

RADIUS is the radius of curvature of the curved shape;

$R_1$ to $R_n$ are preset constants for each segment;

P and Q are compensation factors;

$P_1$ to $P_{n+1}$ and $Q_1$ to $Q_{n+1}$ are preset constants for each segment;

Subsequently in the third step 17, the machining parameters are compensated by the compensation factors as follows:

on-time=on-time×P off-time=off-time×(1+P)

arc-on-time=arc-on-time×P arc-off-time=arc-off-time×(1+P)

wire-tension=wire-tension×(1+Q)

feedrate=feedrate×P wherein on-time: the discharge time under normal condition;

off-time: the time the discharge is off under normal condition;

arc-on-time: the discharge time under arc condition;

arc-off-time: the time the discharge is off under arc condition;

wire-tension: the tension of the wire; and feedrate: reference feed rate of the machining workpiece.

Next in the fourth step 18, the compensated machining parameters are used for the machining process. The result is constantly monitored by the shape precision inspecting means 13 and the error is fed back to the decision means 10. If the error is still greater than a preset tolerance, the subsequent step 19 is executed to correct the criteria as follows. First, the detected radius of curvature is judged as to which range it lies within. If within the range $R_{k-1} \leq RADIUS \leq R_k$, then the (k)th criterion is compensated as follows:

$P_k = P_k + \Delta P$ $Q_k = Q_k + \Delta Q$ wherein $\Delta P$ and $\Delta Q$ are the predetermined amounts of compensation.

In conclusion, the method and apparatus according to the present invention is capable of compensating the machining parameters as on-time, off-time, arc-on-time, arc-off-time, wire-tension, and feedrate based on the detected radius of curvature so as to minimize the machining error caused by flexure of the wire. The compensation factors can be constantly corrected based on the current result of the machining process. This allows the reduction in energy consumption and the discharge frequency used and also allows high precision. The machining error due to manufacture or aging of the wire-cut electric discharge machine can thus be minimized by the compensation to the minimum.

The present invention has been described hitherto with exemplary preferred embodiments. However, it is to be understood that the scope of the present invention need not be limited to the disclosed preferred embodiments. On the contrary, it is intended to cover various modifications and similar arrangements within the scope defined in the following appended claims. The scope of the claims should be accorded the broadest interpretation so as to encompass all such modifications and similar arrangements.

What is claimed is:

1. A method for wire-cutting a workpiece using a wire-cut electric discharge machines said method comprising the following steps:

(1) presetting a plurality of machining parameters, including on-time, off-time, arc-on-time, arc-off-time, wire-tension, and feedrate; wherein on-time is the discharge time under normal condition, off-time is the time the discharge is off under normal condition, arc-on-time is the discharge time under arc condition, arc-off-time is the time the discharge is off under arc condition, wire-tension is the tension of the wire, and feedrate is reference feed rate of the machining workpiece;

(2) determining if the shape of workpiece to be machined is curved, if the workpiece is flat, then performing the wire-cutting using said preset machining parameters in step (1), otherwise recalculating the machining parameters by means of the following substeps:

(2a) presetting a plurality of constants $P_1$ through $P_{n+1}$, $Q_1$ through $Q_{n+1}$, $R_1$ through $R_n$ wherein n is a positive integer, then measuring a radius of curvature of the workpiece to be wire-cut prior to the wire-cutting process;

(2b) obtaining compensation factors P and Q in accordance with the following criteria:

| | |
|---|---|
| criterion 1: | if (RADIUS $\leq R_1$), then (P = $P_1$, Q = $Q_1$) |
| criterion 2: | if ($R_1 \leq$ RADIUS $\leq R_2$), then (P = $P_2$, Q = $Q_2$) |
| criterion 3: | if ($R_2 \leq$ RADIUS $\leq R_3$), then (P = $P_3$, Q = $Q_3$) |
| . | |
| . | |
| criterion n: | if ($R_{n-1} \leq$ RADIUS $\leq R_n$), then (P = $P_n$, Q = $Q_n$) |
| criterion n + 1: | if ($R_n \leq$ RADIUS), then (P = $P_{n+1}$, Q = $Q_{n+1}$) | wherein
RADIUS is the radius of curvature of the curved shape;
(2c) recalculating said machining parameters of on-time, off-time, arc-on-time, arc-off-time, wire-tension, and feedrate by using said compensation factors as follows:
on-time=on-time×P,
off-time=off-time×(1+P),
arc-on-time=arc-on-time×P,
arc-off-time=arc-off-time×(1+P),
wire-tension=wire-tension×(1+P), and
feedrate=feedrate×P;

(3) using said recalculated machining parameters from substep (2c) to perform wire-cutting of the workpiece.

2. A method as claimed in claim 1, which further comprises the following step:

(2d) measuring an error between the radius of curvature of the workpiece that has been cut and and that intended, if the error is greater than a preset tolerance, then correcting said criteria as provided in (2b) as follows: determining within which range the radius of curvature falls, If $R_{k-1} \leq RADIUS \leq R_k$, then changing the (k)th criterion as follows, wherein k is an integer between 1 and n:

$P_k = P_k + \Delta P$
$Q_k = Q_k + \Delta Q$ wherein $\Delta P$ and $\Delta Q$ are the predetermined criteria compensation constants.

3. An apparatus used on wire-cut electric discharge machines for automatically compensating machining parameters, comprising:

(a) means for setting machining parameters including:
on-time: the discharge time under normal condition;
off-time: the time the discharge is off under normal condition;
arc-on-time: the discharge time under arc condition;
arc-off-time: the time the discharge is off under arc condition;
wire-tension: the tension of the wire; and
feedrate: reference feed rate of the machining workpiece (b) controller means including:
(i) interpolation computing means, capable of detecting the shape of workpiece being machined in each segment, if the shape of workpiece being machined in flat, then machining it directly; if a curved shape being detected for machining, then measuring the radius of curvature of the curved shape prior to the machining process, thereafter based on the displacement and feed rate, the locus of machining in flat shape or curved shape is converted to a pulse train output to each axis;
(ii) decision means, receiving data of the measured radius of curvature from said interpolation computing means, for computing compensation factors based on the measured radius of curvature by means of a predetermined set of criteria; and
(iii) parameter correcting means, receiving the compensation factors from said decision means, for compensating accordingly the preset machining parameters; and (c) machining control means, coupled to said parameter correcting means, for transferring the compensated machining parameters for use by the wire-cut electric discharge machine to machine workpiece.

4. An apparatus as claimed in claim 3, further comprising shape precision inspecting means capable of detecting result of machining process and feeding detected error back to said decision means, if the error is greater than a preset tolerance, the criteria in said decision means being corrected.

* * * * *